(12) United States Patent
Norman et al.

(10) Patent No.: US 7,237,841 B2
(45) Date of Patent: Jul. 3, 2007

(54) BACK CONSTRUCTION WITH FLEXIBLE LUMBAR

(75) Inventors: Christopher J. Norman, Byron Center, MI (US); Kurt R. Heidmann, Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 11/048,673

(22) Filed: Feb. 1, 2005

(65) Prior Publication Data

US 2005/0275264 A1   Dec. 15, 2005

(51) Int. Cl.
*A47C 1/024* (2006.01)
(52) U.S. Cl. ................................... 297/301.3
(58) Field of Classification Search ............ 297/284.4, 297/452.15, 300.4, 301.3, 302.3
See application file for complete search history.

(56) References Cited

U.S. PATENT DOCUMENTS

| 293,833 | A | 2/1884 | Winchester |
| 362,796 | A | 5/1887 | Tait |
| 1,590,240 | A | 6/1926 | Gorton |
| 2,087,254 | A | 7/1937 | Herold |
| 2,139,028 | A | 12/1938 | Mensendicck et al. |
| 2,471,024 | A | 5/1949 | Cramer |
| 2,492,107 | A | 12/1949 | Orton et al. |
| 2,627,898 | A | 2/1953 | Jackson |
| 2,712,346 | A | 7/1955 | Sprinkle |
| 2,818,911 | A | 1/1958 | Syak |
| 2,894,565 | A | 7/1959 | Conner |
| 3,106,423 | A | 10/1963 | Schwarz |
| 3,369,840 | A | 2/1968 | Dufton |
| 3,540,777 | A | 11/1970 | de Beaumont |
| 3,565,482 | A | 2/1971 | Blodee |
| 3,813,148 | A | 5/1974 | Kraus |

(Continued)

FOREIGN PATENT DOCUMENTS

JP        47-14408        10/1972

(Continued)

OTHER PUBLICATIONS

Hubbard, Haas et al., "New Biomechanical Models for Automobile Seat Design," Article presented at the 1993 Society of Automotive Engineers International Congress and Exposition, p. 8, (Mar. 1, 1993).

*Primary Examiner*—Milton Nelson, Jr.
(74) *Attorney, Agent, or Firm*—Price, Heneveld, Cooper, DeWitt & Litton LLP

(57) ABSTRACT

A back construction includes a back shell mounted on a back frame at top and bottom connections, and a flexible lumbar section biased forwardly by a biasing device. The bottom connection is located rearward of the back shell to allow unencumbered sliding entry into the seating unit from a lateral side position, but the bottom connection defines a virtual pivot forward of its physical location to provide the desired path of flexure when the lumbar section is flexed. In one form, the bottom connection is a pair of non-parallel links of dissimilar length. In another form, the bottom connection is a follower with two bearings following a guide slot. In some variations, the force of the biasing device is variable. Seating units incorporating the back construction include a vehicle seat, a foldable portable stadium seat, and a wheelchair seat.

61 Claims, 5 Drawing Sheets

U.S. PATENT DOCUMENTS

| | | |
|---|---|---|
| 3,877,750 A | 4/1975 | Scholpp |
| 3,926,286 A | 12/1975 | Johnson |
| 3,934,932 A | 1/1976 | Ekornes |
| 3,938,858 A | 2/1976 | Drabert et al. |
| 3,948,558 A | 4/1976 | Obermeier et al. |
| 3,982,785 A | 9/1976 | Ambasz |
| 3,989,297 A | 11/1976 | Kerstholt |
| 4,007,962 A | 2/1977 | Muller-Deisig |
| 4,054,318 A | 10/1977 | Costin |
| 4,083,209 A | 4/1978 | Sloan, Jr. |
| 4,084,850 A | 4/1978 | Ambasz |
| 4,099,775 A | 7/1978 | Mizelle |
| 4,157,203 A | 6/1979 | Ambasz |
| 4,181,357 A | 1/1980 | Swenson et al. |
| 4,226,473 A | 10/1980 | Johnson |
| 4,309,206 A | 1/1982 | Michaud et al. |
| 4,314,728 A | 2/1982 | Faiks |
| 4,316,632 A | 2/1982 | Brauning |
| 4,333,683 A | 6/1982 | Ambasz |
| 4,380,352 A | 4/1983 | Diffrient |
| 4,390,206 A | 6/1983 | Faiks et al. |
| 4,449,752 A | 5/1984 | Yasumatsu et al. |
| 4,452,486 A | 6/1984 | Zapf et al. |
| 4,465,317 A | 8/1984 | Schwarz |
| 4,502,728 A | 3/1985 | Sheldon et al. |
| 4,521,053 A | 6/1985 | de Boer |
| 4,544,204 A | 10/1985 | Schmale |
| 4,585,272 A | 4/1986 | Ballarini |
| 4,595,237 A | 6/1986 | Nelsen |
| 4,621,864 A | 11/1986 | Hill |
| 4,621,866 A | 11/1986 | Zani |
| 4,632,454 A | 12/1986 | Naert |
| 4,638,679 A | 1/1987 | Tannenlaufer |
| 4,641,884 A | 2/1987 | Miyashita et al. |
| 4,685,730 A | 8/1987 | Linguanotto |
| 4,703,974 A | 11/1987 | Brauning |
| 4,709,963 A | 12/1987 | Uecker et al. |
| 4,720,142 A | 1/1988 | Holdredge et al. |
| 4,730,871 A | 3/1988 | Sheldon |
| 4,763,950 A | 8/1988 | Tobler |
| 4,776,633 A | 10/1988 | Knoblock et al. |
| 4,779,925 A | 10/1988 | Heinzel |
| 4,834,453 A | 5/1989 | Makiol |
| 4,834,454 A | 5/1989 | Dicks |
| 4,842,333 A | 6/1989 | Meiller |
| 4,848,837 A | 7/1989 | Volke |
| 4,854,641 A | 8/1989 | Reineman et al. |
| 4,861,108 A | 8/1989 | Acton et al. |
| 4,878,710 A | 11/1989 | Tacker |
| 4,880,271 A | 11/1989 | Graves |
| 4,889,384 A | 12/1989 | Sulzer |
| 4,892,356 A * | 1/1990 | Pittman et al. ........ 297/452.15 |
| 4,896,918 A | 1/1990 | Hoshihara |
| 4,906,045 A | 3/1990 | Hofman |
| 4,913,303 A | 4/1990 | Harris |
| 4,915,449 A | 4/1990 | Piretti |
| 4,948,198 A | 8/1990 | Crossman |
| 4,951,995 A | 8/1990 | Teppo et al. |
| 4,966,413 A | 10/1990 | Palarski |
| 4,968,093 A | 11/1990 | Dal Monte |
| 4,981,326 A | 1/1991 | Heidmann |
| 4,984,846 A | 1/1991 | Ekornes |
| 5,009,466 A | 4/1991 | Perry |
| 5,027,022 A | 6/1991 | Tanaka et al. |
| 5,029,940 A | 7/1991 | Golynsky et al. |
| 5,037,116 A | 8/1991 | Desanta |
| 5,039,163 A | 8/1991 | Tolleson |
| 5,044,693 A | 9/1991 | Yokota |
| 5,050,930 A | 9/1991 | Schuster et al. |
| 5,056,862 A | 10/1991 | May et al. |
| 5,062,676 A | 11/1991 | Mars |
| 5,087,098 A | 2/1992 | Ishizuka |
| 5,100,200 A | 3/1992 | Keusch et al. |
| 5,100,201 A | 3/1992 | Becker, III et al. |
| 5,102,196 A | 4/1992 | Kaneda et al. |
| 5,106,157 A | 4/1992 | Nagelkirk et al. |
| 5,107,720 A | 4/1992 | Hatfield |
| 5,110,003 A | 5/1992 | MacWilliams |
| 5,112,108 A | 5/1992 | Zapf |
| 5,120,109 A | 6/1992 | Rangoni |
| 5,192,114 A | 3/1993 | Hollington et al. |
| 5,193,880 A | 3/1993 | Keusch et al. |
| 5,217,278 A | 6/1993 | Harrison et al. |
| 5,240,308 A | 8/1993 | Goldstein et al. |
| 5,249,839 A | 10/1993 | Faiks et al. |
| 5,277,475 A | 1/1994 | Brandes |
| 5,282,670 A | 2/1994 | Karsten et al. |
| 5,299,851 A | 4/1994 | Lin |
| 5,302,002 A | 4/1994 | Nagasaka |
| 5,308,145 A | 5/1994 | Koepke et al. |
| 5,318,346 A | 6/1994 | Roossien et al. |
| 5,320,410 A | 6/1994 | Faiks |
| 5,328,242 A | 7/1994 | Steffens et al. |
| 5,354,120 A | 10/1994 | Volkle |
| 5,364,162 A | 11/1994 | Bar et al. |
| 5,366,274 A | 11/1994 | Roericht et al. |
| 5,385,388 A | 1/1995 | Faiks et al. |
| 5,405,188 A | 4/1995 | Hanson |
| 5,423,593 A | 6/1995 | Nagashima |
| 5,447,356 A | 9/1995 | Snijders |
| 5,449,086 A | 9/1995 | Harris |
| 5,452,868 A | 9/1995 | Kanigowski |
| 5,460,427 A | 10/1995 | Serber |
| 5,472,261 A | 12/1995 | Oplenskdal et al. |
| 5,474,360 A | 12/1995 | Chang |
| 5,487,591 A | 1/1996 | Knoblock |
| 5,505,520 A | 4/1996 | Frusti et al. |
| 5,518,294 A | 5/1996 | Ligon, Sr. et al. |
| 5,529,201 A | 6/1996 | Tallent et al. |
| 5,540,481 A | 7/1996 | Roossien et al. |
| 5,564,783 A | 10/1996 | Elzenbeck et al. |
| 5,573,302 A | 11/1996 | Harrison et al. |
| 5,577,807 A | 11/1996 | Hodge et al. |
| 5,582,459 A | 12/1996 | Hama et al. |
| 5,590,932 A | 1/1997 | Olivieri |
| 5,597,203 A | 1/1997 | Hubbard |
| 5,611,598 A | 3/1997 | Knoblock |
| 5,630,647 A | 5/1997 | Heidmann et al. |
| 5,636,898 A | 6/1997 | Dixon et al. |
| 5,651,584 A | 7/1997 | Chenot et al. |
| 5,660,439 A | 8/1997 | Unwalla |
| 5,782,536 A | 7/1998 | Heidmann |
| 5,791,733 A | 8/1998 | van Hekken |
| 5,860,701 A | 1/1999 | Jungjohann et al. |
| 5,868,467 A | 2/1999 | Moll |
| 5,871,258 A | 2/1999 | Battey |
| 5,915,788 A | 6/1999 | Schneider |
| 5,947,558 A | 9/1999 | Suzuki et al. |
| 5,975,634 A | 11/1999 | Knoblock et al. |
| 6,003,943 A | 12/1999 | Schneider |
| 6,035,901 A | 3/2000 | Stumpf |
| 6,099,075 A | 8/2000 | Watkins |
| 6,135,559 A | 10/2000 | Kowalski |
| 6,250,715 B1 | 6/2001 | Caruso |
| 6,367,876 B2 | 4/2002 | Caruso |
| 6,412,869 B1 | 7/2002 | Pearce |
| 6,474,737 B1 | 11/2002 | Canteleux et al. |
| 6,523,898 B1 | 2/2003 | Ball et al. |
| 6,536,841 B1 | 3/2003 | Pearce et al. |
| 6,609,755 B2 | 8/2003 | Koepke et al. |
| 6,669,292 B2 | 12/2003 | Koepke et al. |
| 6,679,553 B2 | 1/2004 | Battey et al. |
| 6,709,058 B2 | 3/2004 | Diffrient |
| 7,032,971 B2 * | 4/2006 | Williams .................. 297/284.4 |

| | | |
|---|---|---|
| 2002/0003366 A1 | 1/2002 | Fourrey et al. |
| 2002/0047297 A1 | 4/2002 | Longhi et al. |
| 2002/0130540 A1 | 9/2002 | Rajasingham |
| 2002/0163233 A1 | 11/2002 | Craft et al. |
| 2002/0180248 A1 | 12/2002 | Kinoshita et al. |
| 2003/0071500 A1 | 4/2003 | Dinkel et al. |
| 2003/0094841 A1 | 5/2003 | McMillen et al. |
| 2003/0137171 A1 | 7/2003 | Deimen et al. |
| 2003/0189367 A1 | 10/2003 | Erker |
| 2003/0214166 A1 | 11/2003 | Schambre et al. |

FOREIGN PATENT DOCUMENTS

| | | |
|---|---|---|
| JP | S47-14408 | 10/1972 |
| JP | 5-184432 | 7/1991 |
| JP | H5-184432 | 7/1993 |

* cited by examiner

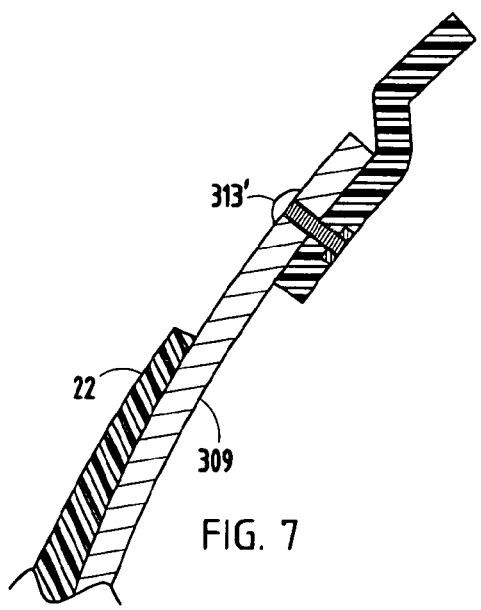
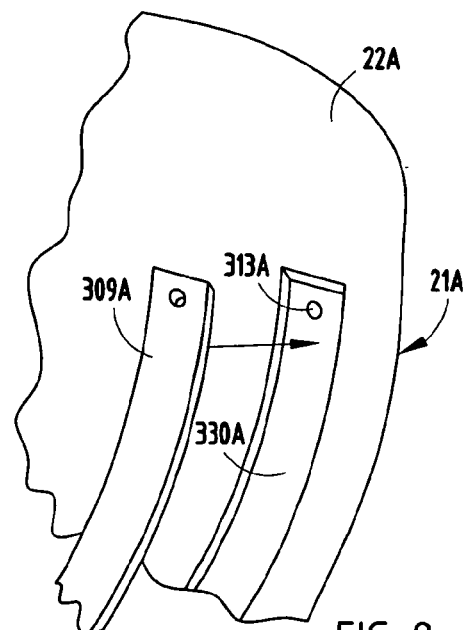
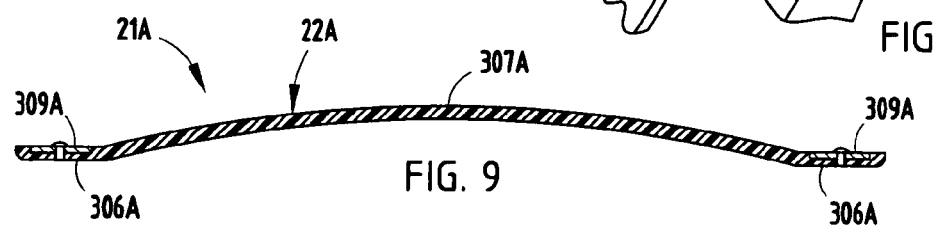
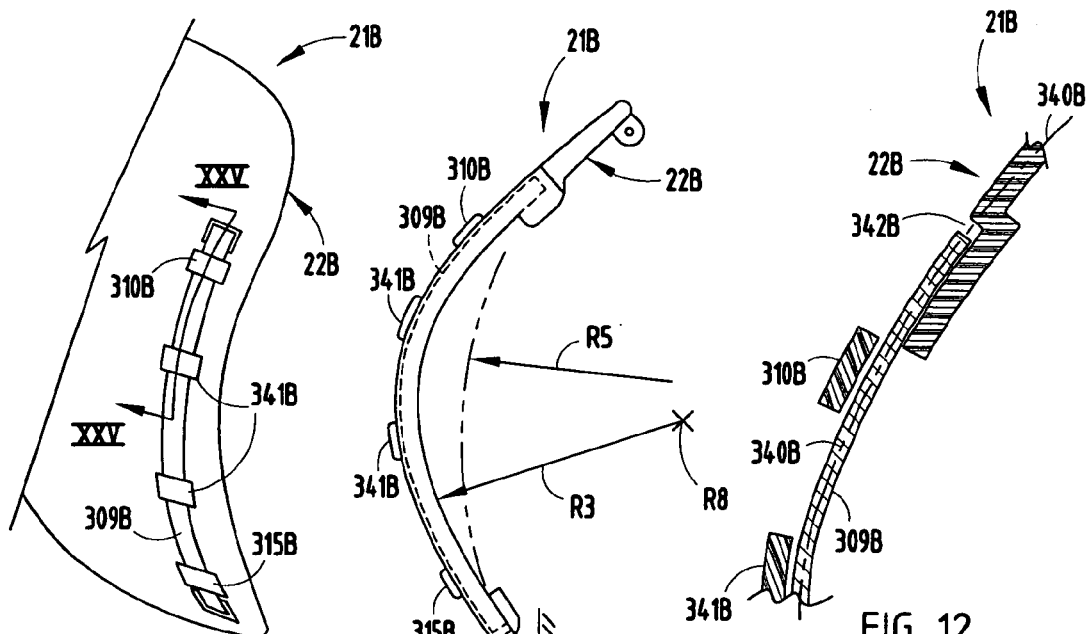

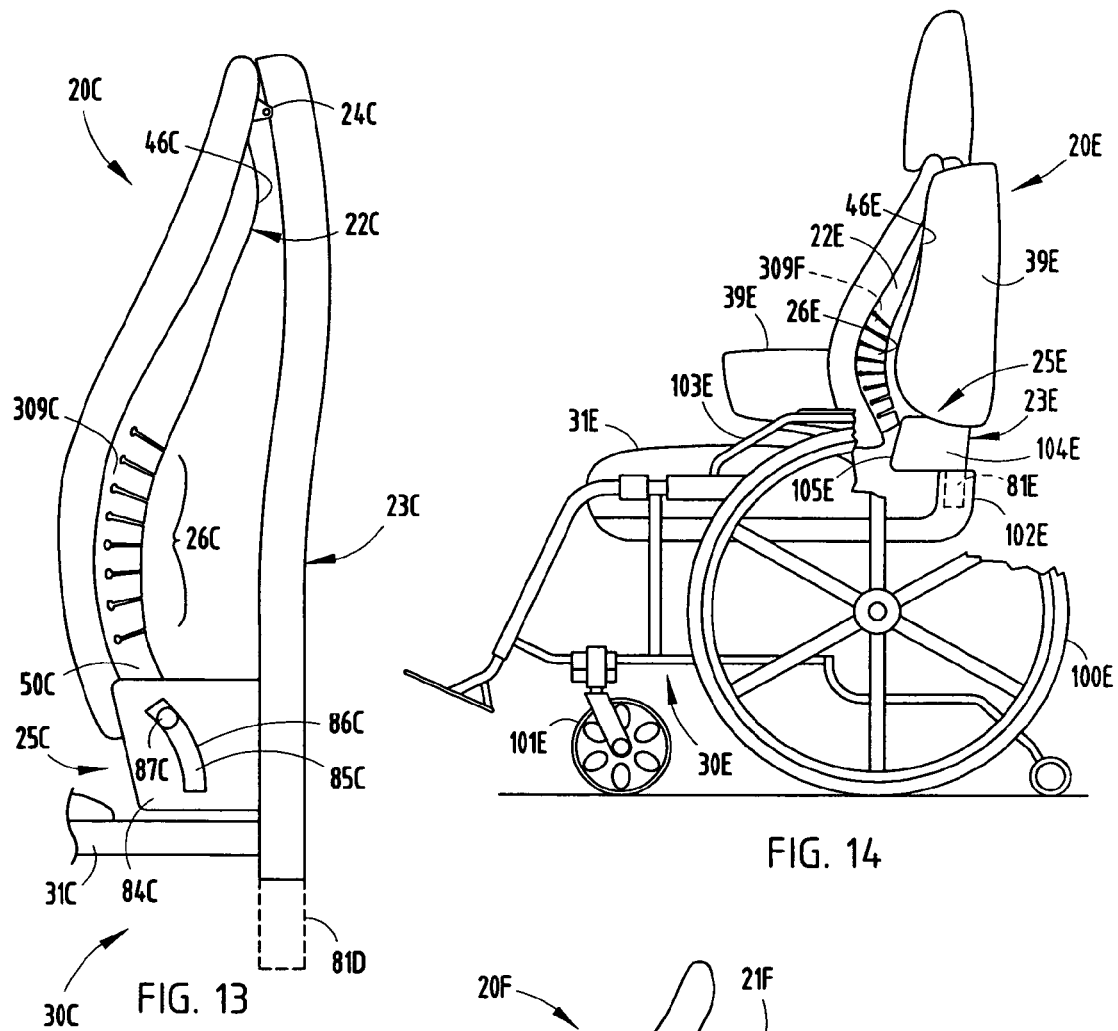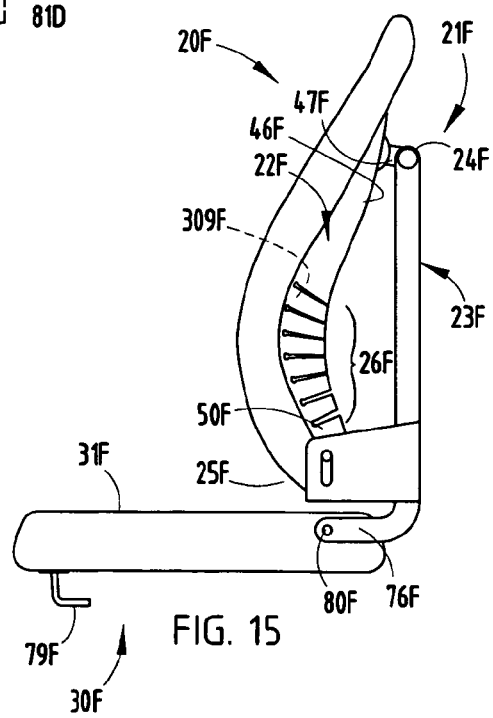

BACK CONSTRUCTION WITH FLEXIBLE LUMBAR

BACKGROUND

The present invention relates to back constructions with flexible lumbar support, such as may be used not only for chairs and furniture seating, but also in vehicle and vessel seating (personal and mass-transit, including automobiles, trucks, buses, planes, trains, boats, etc.), stadium and auditorium seating, bench and multi-person seating, and other seating arrangements.

A comfortable and ergonomic back construction is disclosed in Battey et al. U.S. Pat. No. 5,871,258 (hereafter the "Battey '258 patent"). The back construction in the Battey '258 patent includes a back shell pivoted to a back frame at top pivots and at forwardly-located bottom pivots, and includes a flexible lumbar section that combines with stiff thoracic and pelvic sections and the pivots to cause the back to flex along a well-defined predetermined path. A biasing mechanism biases the lumbar section forwardly for optimal support to a seated user. Notably, in the Battey '258 patent, the bottom pivots are located on flanges (134) that extend forward of a front surface of the back shell, in a position where they limit overall design options and potentially interfere with laterally sliding onto the seat from a side position. It is desirable in some environments and some seating applications to eliminate interference to lateral entry onto the seat caused by the forwardly-extending flanges. At the same time, it is desirable to maintain the ergonomic function and comfortableness of a flexible back shell construction similar to the one shown in the Battey '258 patent.

It has been discovered that back supports with very flexible lumbar regions can potentially have issues caused by "uncontrolled flexure". Specifically, under extreme conditions, a highly flexible back support may bend in ways that do not represent human shapes, such as "S" shapes or non-arcuate "non-human-like" shapes. The reason this is important is because non-human-like shapes cause localized uncomfortable pressure in the back and/or lines of uncomfortably high pressures in the back. The original Leap® chair designs (e.g. see Battey U.S. Pat. No. 5,871,258, FIG. 12) attempted to solve this problem of bending to "non-human-like" shapes by providing forwardly-curved back shell material with first pivot points near the upper back and second pivot points forward of the lower pelvic (or belt) area. However, it is desirable to better control flexure of the back shell with fewer design constraints in regard to pivot locations, and while at the same time simplifying overall construction and design of a back shell and while reducing components and assembly time. It is also desirable to provide a back support design that is made of environmentally friendly materials, and made of easily recyclable components.

Heidmann U.S. Pat. No. 6,616,228 discloses a back arrangement where a flexible back shell is pivotally mounted at a top location and pivotally/slidably supported at a bottom location. However, testing has shown that better control over flexure of the back shell and better control over movement of and orientation of a lower edge of the back shell may be desired, while also requiring fewer design constraints in regard to pivot locations, and while at the same time simplifying overall construction and design of a back shell and while reducing components and assembly time.

Also, increased design flexibility is desired for both aesthetic and functional aspects, such as to allow relocation of or elimination of the top and/or bottom pivots, while maintaining a relatively simple mechanical assembly, while using environmentally-friendly parts that can be readily disassembled and recycled, and while still providing an open lateral access path into the seating area in front of the back.

Thus, a system having the aforementioned advantages and solving the aforementioned problems is desired.

SUMMARY OF THE INVENTION

In one aspect of the present invention, a back construction for a seating unit includes a back shell having a flexible lumbar region, where a vertical section through the lumbar region defines a first radius and where the lumbar region has a first resilient stiffness. The back construction further includes at least one vertically-extending elongated spring with a second resilient stiffness at least twice the first resilient stiffness. The elongated spring has an arcuate section coupled to and coextensive with the lumbar region. The lumbar region and the elongated spring form a combination that, when engaged with a point-focused load, flexes into different uniformly-curved shapes of increasing radii, with the spring acting to distribute forces across the lumbar region while continuously maintaining a uniform curvature in the lumbar region.

In a narrower form, the material of the back shell has a Young's modulus of less than about 170,000 psi, while the material of the spring has a Young's modulus of at least about 5,000,000 psi. Also, in another narrower form, the material of the back shell has a yield strength of less than about 3,550 psi, and wherein the material of the spring has a yield strength of at least about 80,000 psi.

In another aspect of the present invention, a back construction for a seating unit includes a back shell having a flexible lumbar region, where a vertical section through the lumbar region defines a first radius when in an unstressed state. The back construction further includes a vertically-extending elongated spring having an arcuate section coupled to and coextensive with the lumbar region, the spring defining a second radius when in an unstressed state. The lumbar region and the elongated spring form a third radius when coupled together. The lumbar region and the elongated spring form a combination that, when engaged with a point-focused load, flexes into different shapes, with the spring being pre-tensioned and acting to distribute forces across the lumbar region while continuously maintaining a desired supportive force.

In yet another aspect of the present invention, a back construction for a seating unit includes a back shell having a flexible lumbar region and a vertically-extending elongated spring attached to the back shell and extending vertically across the lumbar region. The elongated spring is attached to the back shell by a releasable mechanical connection. The spring is coextensive with the lumbar region and forms a combination with the lumbar region that, when engaged with a point-focused load, flexes into different shapes, with the spring acting to distribute forces across the lumbar region.

In still another aspect of the present invention, a back construction for a seating unit includes a back frame and a back shell. The back shell includes a flexible lumbar region with edge strips extending vertically across the lumbar region and includes leaf springs attached to the back shell and supporting the edge strip to form a combination with the lumbar region that, when engaged with a point-focused load, flexes into different shapes, with the springs acting to distribute forces across the lumbar region. The back construction further includes a top connection connecting the back shell to the back frame, and bottom means located entirely rearward of a front surface of the back shell for supporting a lower edge of the back shell on the back frame for relative movement to the back frame when the lumbar region is flexed, with the leaf springs controlling a majority of the flexure of the lumbar region and the bottom means does not control a majority of the flexure.

These and other aspects, objects, and features of the present invention will be understood and appreciated by those skilled in the art upon studying the following specification, claims, and appended drawings.

BRIEF DESCRIPTION OF DRAWINGS

FIG. 7 is a cross section similar to FIG. 5 but with an alternative spring-to-back-shell top attachment;

FIG. 8 is an exploded fragmentary perspective view of a second modified back construction where the leaf spring is set into a channel formed in the back shell;

FIG. 9 is a cross section taken horizontally through the top attachment in FIG. 8.

FIG. 10 is a fragmentary perspective view of a chair including a third modified back construction according to the present invention;

FIG. 11 is a side view of the back construction in FIG. 10;

FIG. 12 is an enlarged cross section of a top portion from FIG. 11;

FIGS. 13-15 are fourth, fifth, and sixth modified back constructions according to the present invention.

DETAILED DESCRIPTION OF PREFERRED EMBODIMENTS

Figure 3:
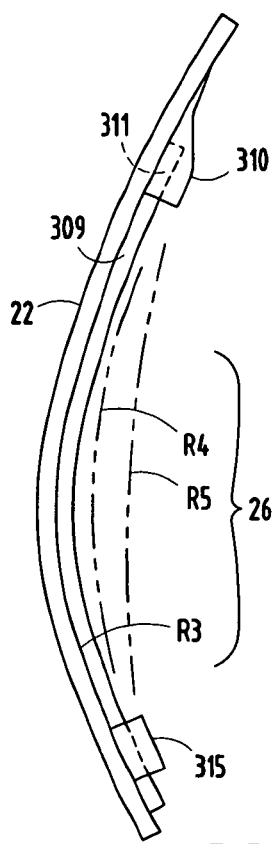
FIGS. 3-4 are side views of the back construction in FIG. 2, FIG. 3 being an assembly and FIG. 4 being an exploded view of the assembly with components being shown in unstressed states.

The present disclosure focuses on a seating unit 20 (FIG. 1) having a back construction 21 that provides excellent lumbar support. The back construction 21 includes a back shell 22 (FIG. 3) (also called a "back support" herein) pivoted to a back frame 23 at a top connection 24 and slidably abuttingly engaging the back frame 23 at a bottom location 25. The back shell 22 incorporates a flexible lumbar section 26 biased forwardly for optimal ergonomic back support by a biasing device (i.e., leaf springs 309). The illustrated abutting bottom abutting arrangement at location 25 is located rearward of a front surface along edges of the back shell 22 to allow unencumbered sliding side entry (i.e., side-open access) into the seating unit 20 from a lateral side position. The bottom location 25 in combination with the springs 309 controls and constrains flexure of the lumbar region so that it is always a curved arcuate segment (though with a changing radius). Concurrently, this combination also controls and constrains movement of the stiff pelvic section 50 to a particular path and particular angular presentation along the path. The top and bottom end points of the pelvic section 50 along the path roughly define a virtual pivot forward of its physical location on the back construction 21. This results in the desired path of flexure when the lumbar section 26 is flexed for optimal comfort and support. The ability to slide into the seating unit 20 is particularly advantageous in automotive, truck, and heavy equipment seating where there is a steering wheel to avoid. Also, the side-open access is advantageous in public seating where a person needs to or may want to slide in from a side of the seat, such as in auditoriums and stadium seating. However, it is also potentially desirable in many furniture and more traditional seating designs, such as for aesthetic purposes, design, and functional reasons, as described below.

The illustrated seating unit 20 (FIG. 1) includes a castored base 30 suitable for use in an office environment. However, it is contemplated that many different bases can use the present inventive concepts, including bases configured for many different passenger vehicles (e.g. car, truck, plane, train, and bus vehicles) and for many different other seating applications (e.g. auditorium, stadium, bench, chairs, and furniture applications). It is contemplated that the seat 31 and back 21 can be adjustably supported on the base 30 and can include a variety of different adjustment mechanisms, such as by a height adjustment mechanism, a seat-and-back depth adjustment mechanism, a seat-only depth adjustment mechanism, a seat tilt adjustment mechanism, a back spring tension adjustment mechanism, a back lock device, and/or a back stop device. Such mechanisms are known in the art and it is contemplated that they can be manual, electrical, pneumatic, or hydraulic; and that they can be controlled by manual or electrical control switches at convenient locations such as a location adjacent a side of the seat 31. Since such mechanisms are known, a detailed discussion of their construction is not required for an understanding of the present inventive concepts.

It is also contemplated that the present back construction can be used in combination with a variety of different back frames, seats, bases, and armrests. Several different back frames and bases are illustrated herein. However, it is contemplated that the back frame could be other configurations not specifically illustrated herein, such as a perimeter frame, or a spine frame. Also, different bases and seats can be used. Accordingly, it is to be understood that the present inventive concepts are not intended to be limited to only the illustrated arrangements.

Figure 2:
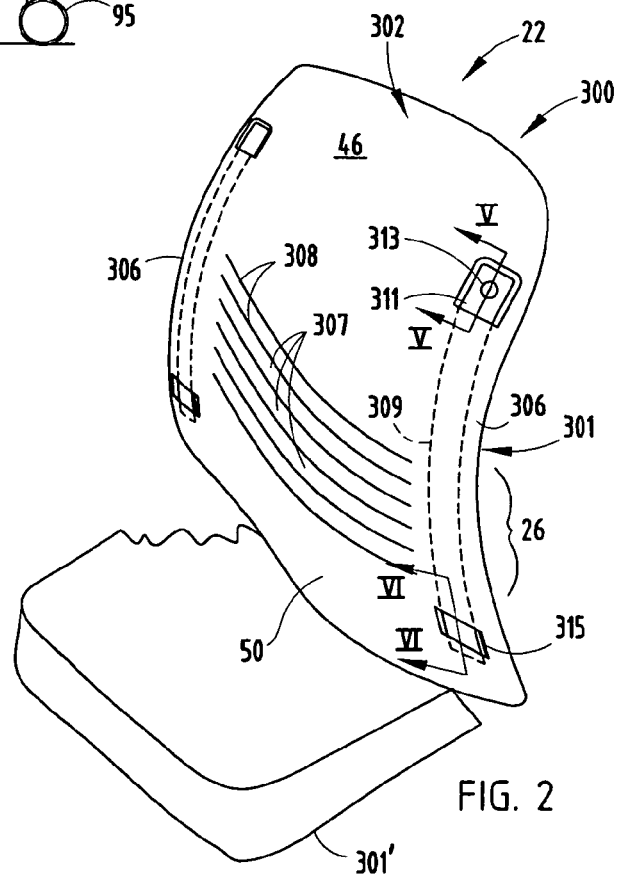
FIG. 2 is a perspective view of the back shell used in the back construction of FIG. 1.

The back shell 22 (FIG. 2) is made from a unitary molded sheet of "solid" plastic material, and includes a plurality of parallel horizontal slits along its lumbar region 26, causing the lumbar region 26 to be flexible. The present discussion is sufficient for an understanding of the present back shell 27, however, the reader is referred to Battey U.S. Pat. No. 5,871,258 for additional disclosure, if desired. The teachings and entire content of Battey U.S. Pat. No. 5,871,258 are incorporated herein in their entirety.

The back shell 22 includes a stiff thoracic section 46 with two horizontally-spaced top pivots 47 defined along its upper edge, and also includes a stiff pelvic section 50. The top pivots 47 pivotally engage mating pivots near a top of the back frame 23 to form the top connections 24. The stiff thoracic section 46 and/or the pelvic section 50 can be reinforced if necessary for stability, with the braces being integral or add-on components to the back shell 22. A pair of leaf-spring-like edge strips 306 extend vertically along and across the lumbar section 26 and connect the thoracic and pelvic sections 46 and 50, and a plurality of flexible horizontal strips extend between the edge strips 306 in the lumbar section 26. A cushion may be used (but does not need to be used) on the back construction 21. As illustrated, a cushion is positioned on the back shell 22 which causes the front surface of the back 21 to be located forward of the front surface of the back shell 22 itself. It is noted that horizontal cross sections taken through the thoracic section 46, lumbar section 26 and the pelvic section 50 of the back shell 22 are forwardly concave in shape, and that a vertical cross section is forwardly protruding in the lumbar section 26.

The base 30 (FIG. 1) comprises a vertically extendable adjustable center post 93, radially-extending legs 94 with castors 95, and an underseat control 96 supported atop the center post 93. An upright back frame 23 extends from the control 96 to support the back shell 22. The back frame 23 is operably pivotally supported by the control 96 (as is known in the art) for movement between an upright position and a recline position, and the control 96 includes a spring biasing the back 21 toward the upright position. The back 23 is reclinable, and the seat 31 and back 23 are supported for synchronous motion upon recline of the back 21. Armrests 39 are shown, including an L-shaped fixed support extending outwardly from the base 30 and then upwardly beside the seat 31. The illustrated armrests 39 are fixed. It is contemplated that armrests 39 could be aesthetic and/or functional and/or adjustable (vertically, angularly, fore-aft, or otherwise), and that they could be movable to a storage position permitting sliding side access into the seating unit 20.

Figure 1:
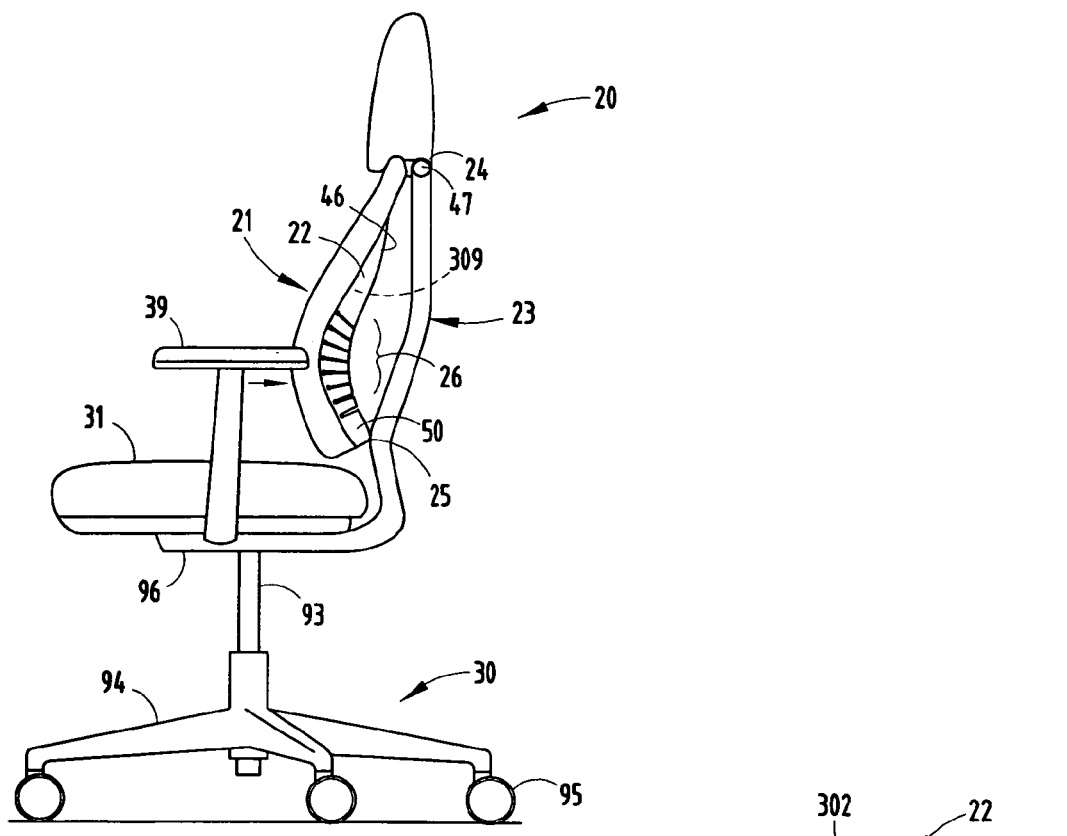
FIG. 1 is a side view of a seating unit embodying the present invention.

The back frame 23 (FIG. 1) includes a forwardly protruding section with a front surface configured to slidingly abuttingly engage the lower edge of the back shell 22 at bottom lower location 25. In seating unit 20, there is no direct connection at location 25. Instead, the back shell 22 is allowed to swing forwardly about top pivot connection 24. Where the top connection 24 is made releasable, such as when a removable pin or other separable arrangement, the back shell 22 can be easily removed for cleaning, sanitation, replacement, and the like. In FIG. 1, a head of the removable pin is represented by the circle at top pivot location 24, with the pin being laterally extended through overlapping apertured flanges on the back shell 22 and back frame 23. It is contemplated that other releasable arrangements and motion-permitting arrangements can also be used. Significantly, the front surface of the lower portion of the back frame 23 is optimally shaped to cause the pelvic section of the back shell 22 to move along a predetermined path, with the seated user urging the back shell 22 rearwardly against the front surface of the back frame 23 during said relative movement. The reason that the lumbar section 26 continues to provide excellent lumbar support in seating unit 20 is because of the stress-distributing characteristics of the lumbar section 26 including the resilient edge strips along sides of the lumbar section 26 and the leaf spring 309 attached thereto. As noted in the embodiments illustrated in the discussion and discussed below, the resiliency and effectiveness of the edge strips is enhanced by attachment of leaf springs to the edge strips.

The fact that a direct bottom connection is not required (see FIG. 1) is considered to be a surprising and unexpected result of the present invention, and is considered to be an innovative and novel feature. Elimination of a direct bottom connection eliminates hardware and saves part cost and assembly time. Also, elimination of a "hard" bottom connection allows the back shell 22 to be pivoted about the top connection 24. It is contemplated that the absence of a direct "hard" bottom connection (see 25) can be advantageously used in a wheel chair such as wheel chair 20E (see FIG. 14) where it may be desirable to pivot the back shell out of the way to facilitate cleaning and sanitizing the wheel chair . . . or for collapsing the wheel chair for transport and/or storage . . . or to reduce a weight of the wheel chair. This same arrangement (i.e., no "hard" bottom connection) also can be advantageous in a folding seating unit such as in a stadium seating unit 20F (see FIG. 15) where it is desirable to fold the seating unit flat for storage and transport. It is contemplated that the top connection 24 can be made releasable, such as by using a removable pin or a disconnecting hinge, so that the back shell 22 can be easily removed for cleaning and replacement by releasing only one connection (i.e., the top connection). It is also contemplated that the bottom support at location 25 can include a roller or lubricious bearing to improve the sliding motion.

As noted above, back shell 22 (FIG. 2) has a relatively stiff thoracic region 46 and a relatively stiff pelvic region 50 connected by the flexible lumbar region 26. The flexible lumbar region 26 includes a pair of edge strips 306 that extend between the thoracic and pelvic regions 46 and 50. A plurality of horizontal straps 307 extend horizontally between the edge strips 306 and are separated by slots 308. The back shell 22 (including components 46, 50, 306) are integrally formed from a single molding of a structural plastic such as polypropylene (or alternatively, nylon or other engineering plastic). The preferred polypropylene has a yield strength of about 3,550 psi and a Young's modulus of about 170,000 psi. The material of the back shell preferably has an acceptable strength, flexibility, moldability, memory, and low/competitive cost.

Leaf springs 309 are coupled to the edge strips 306 and extend vertically across the lumbar region 26, with their top end extending to a top location slightly above the top strap 307 and with their bottom end extending to a bottom location slightly below the bottom strap 307. The illustrated leaf springs 309 have a length sufficient to extend across the lumbar region, such as about 6-10 inches or more, and have a cross section that is rectangular, with a width that is an about a half inch to one inch. The width of the illustrated springs 309 is about 4 or more times its thickness so that it blends in well with the "thin aesthetics" and thin dimensions along an edge of the chair back construction. It is contemplated that springs having other cross sections (e.g., round or oval) can also be used. The ends of the illustrated leaf springs extend above and below the lumbar region at least about an inch or so and are relatively flat. The ends of the illustrated springs extend non-arcuately from the arcuate intermediate section of the leaf spring, while the center section of the springs extend arcuately across the lumbar region of the back shell coextensively with the lumbar region of the back shell. It is contemplated that the leaf springs 309 will be substantially higher in yield strength and flexural modulus and Young's modulus than the material of the back shell 302. For example, where a composite or polymeric-based leaf spring 309 is used, such as a fiberglass spring, it is preferred to have a yield strength of at least about 80,000 psi and a Young's modulus of about 5,000,000 psi. Also, an epoxy or other spring material could be used. Also, a metal spring material could be used such as spring steel. The spring material preferably should have an excellent memory, resist kinking, resist taking a set, and avoid creep. It is contemplated that the spring yield strength and Young's modulus will be at least double, or more preferably at least about ten times, or still more preferably about twenty times the yield strength and Young's modulus of the back shell material, depending on particular design criteria.

Figure 4:
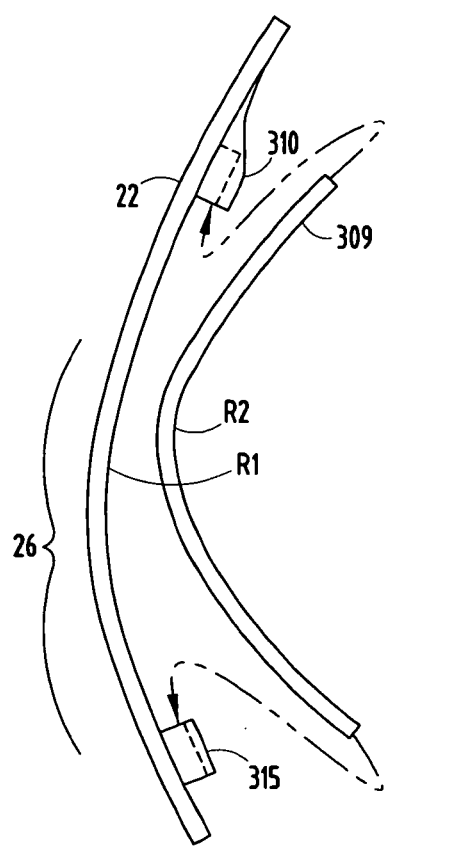
Figure 5:
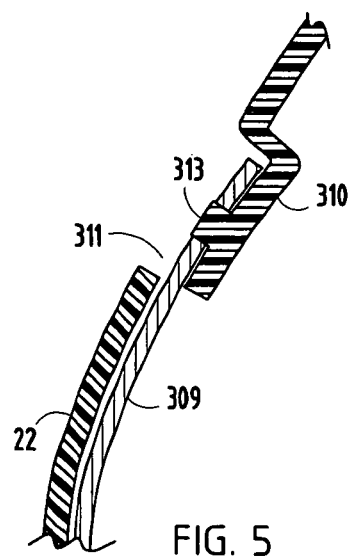
FIGS. 5-6 are cross-sectional views taken along lines V-V and VI-VI in FIG. 2.
Figure 6:
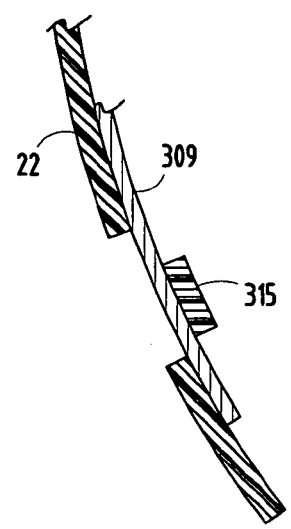

It is contemplated that the leaf springs 309 can be attached to the back shell 22 in a number of different ways. The illustrated back shell 22 (FIG. 3) includes a recessed wall section or tunnel strap 310 forming a downwardly-facing pocket 311 that opens both downwardly and also opens forwardly onto a front surface of the back shell 22 at a location slightly above the lumbar region 26. A protrusion 313 (FIG. 5) is formed in a middle of the wall section 310 (or a stud is insert-molded therein) for receiving and retaining the springs 309 as discussed below. A tunnel strap 315 (FIG. 4) is formed on back shell 22 at a location slightly below the lumbar region 26. The tunnel strap 315 (FIG. 6) creates an area that opens upwardly and also defines a forwardly facing opening that opens onto the front surface of the back shell 22. The forwardly facing openings defined by the pocket 311 and the tunnel strap 315 assist in molding the back shell 22. The vertical opening defined by the tunnel strap 315 allows a bottom end of the leaf spring 309 to be first slipped under the tunnel strap 315. The leaf spring 309 is then extended under the strap a sufficient distance to allow the top end of the leaf spring 309 to be extended upwardly into the pocket 311 under the wall section 310.

The top end of the leaf spring 309 (FIG. 5) includes a hole that matably engages the protrusion 313, thus securing the leaf spring 309 to the back shell 22 in a position coextensive with and juxtaposed along the edge strips 306. The protrusion 313 can be made to resiliently snap into the hole to facilitate assembly, if desired. This arrangement provides for a quick mechanical connection but without the use of separate fasteners. This mechanical connection provides for efficient and quick assembly, allows for easy disassembly (which is considered to be highly desirable for recyclability and environmental friendliness), and minimizes parts required for assembly. The illustrated springs abuttingly engage a rear surface of the back shell across the lumbar section 26. The lower connection of the spring slides to permit flexure of the back shell without binding against a longitudinal length of the spring. It is noted that the springs can be inset into a channel in the edge strips of the lumbar region of the back shell to reduce or eliminate the need to have the leaf springs slip relative to the back shell upon flexure in the lumbar region. This is referred to as aligning the leaf springs in the bend plane or also referred to as positioning the leaf springs in the bending plane of the back shell, as described below. (See FIGS. 8-9 discussed below.)

The back shell 22 (FIG. 4) is molded so that in its unstressed state, the lumbar region 26 (especially the edge strips 306) define a radius R1 (when viewed from a side position) that is greater than about 8 inches. In other words, the lumbar region 26 is flatter and less curved in its unstressed state than after the leaf springs 309 are attached. Constrastingly, the leaf springs 309 are formed to have a curvilinear shape that is significantly less than 8 inches radius, such as a radius R2. When the leaf springs 309 are coupled to the edge strips 306, their combination resolves itself as a pre-stressed condition of the springs in the lumbar region where the assembled radius R3 is about 8 inches. The lumbar region of the back shell 22 and the elongated springs 309 form a combination that, when engaged with a point-focused load, flex the lumbar region into uniformly-curved shapes of increasing radii, with the springs 309 acting to distribute forces across the lumbar region while continuously maintaining a uniformity of curvature in the lumbar region. (See the dashed lines and radii R3, R4, R5 in FIG. 3.) The present inventors have discovered that maintaining a uniform curvature in the lumbar region is an important characteristic that leads to surprisingly good comfort and support to the seated user. In other words, it is considered important that the lumbar region at any single point in time defines an arcuate segment having a single radius, keeping in mind that the radius length changes over time during flexure of the lumbar region 26.

FIG. 7 illustrates a pair of pre-bent leaf springs 309 attached coextensive with the edge strips 306, with the bottom end of the springs retained by tunnel straps 315 and the top end retained by pockets 311 and protrusion 313. Notably, in this arrangement, the leaf springs 309 are positioned behind the edge strips 306, and need only to be retained at their upper and lower ends . . . since the intermediate sections of the springs 309 are biased forwardly against the lumbar region. This is advantageous since it positions the leaf springs 309 where they will not be seen or felt. This arrangement allows the back shell 22 to flex in the lumbar region 26 without stressing the springs 309 longitudinally (which would distort flexure of the weaker back shell 22 in the lumbar region). FIG. 7 shows that the top end of the leaf springs 309 can be retained by a screw 313' and nut instead of by a single integral (or embedded) protrusion 313.

Variations and modifications are contemplated in the above concepts. In such variations and modifications, identical and similar characteristics, components, and features are identified by using the same numbers, but with the addition of the letters "A", "B", "C" and etc. This is done to reduce redundant discussion and not for another purpose.

FIGS. 8-9 show a back construction 21A having a back shell 22A with elongated recesses or channels 330A formed into the edge strips 306A. Leaf springs 309A are set into the channels 330A, such as by snap-fit, by thermoforming attachment, by mechanical attachment, or by other known attachment methods. For example, the back shell 22A includes a protrusion 313A formed in at a top of the channel 330A, the protrusion 313A being shaped to fit through a mating hole in a top end of the leaf spring 309A. The protrusion 313A can be shaped to snappingly engage the leaf spring 309A, or it could be thermoformed or heat-staked to form a rivet-like retention mechanism. FIG. 9 is a horizontal cross section taken through the lumbar section 26A, and shows that the leaf springs 309A on each side of the back shell 22A are aligned with each other. Also, the edge strips 306A on each side are aligned with each other and with the springs 309A. Contrastingly, the horizontal straps 307A are curvilinear in shape as they extend horizontally between the edge straps 306A.

It is contemplated that the leaf springs can be insert-molded into the edge strips of the back shell. The physical location would be similar to that shown in FIGS. 8-9. Pre-stressing would have to be accomplished by holding a particular stressed shape of the leaf springs during the molding process, or by stressing the lumbar region of the molded back shell after the molding process.

A back construction 21B (FIGS. 10-12) is similar to the back construction 21 (FIG. 2), but in back construction 21B, the leaf springs 309B are recessed into the back shell 22B such that they are aligned with the bend line 340B (FIG. 12) of the back shell 22B. Also, additional intermediate tunnel straps 341B are provided between the top and bottom tunnel straps 310B and 315B. Since the springs 309B are on the bend line 340B, they do not slide relative to the edge strips 306B as the lumbar region 26B is flexed. Thus, the pockets 342B formed under the top and bottom tunnel straps 310B and 315B are sufficient to retain the springs 309B in place. The retention can potentially be done without the need for a protrusion (such as without protrusion 313, FIG. 5) and without the need for a separate fastener (such as without fastener 313', FIG. 7), where ends of the pockets or friction are deep enough or otherwise adequate to secure the springs in captured non-slip positions. The illustrated arrangement allows the back shell 22B to flex in the lumbar region 26B without stressing the springs 309B longitudinally (which would distort flexure of the weaker material of the back shell 22B in the lumbar region). It is contemplated that the ends of the leaf springs 309B can be retained by a screw or by other means instead of by friction alone. (See FIG. 7.)

It is preferred that the leaf springs be coupled to the edge strips of the back shell in a juxtaposed manner that causes the leaf springs to support the edge strips continuous along their length during all conditions of flexure. Where this occurs, it has been discovered that the lower edge of the back shell can be controlled well enough, and also the lumbar flexure can be controlled well enough, such that the lower edge of the back shell does not have to be attached to a track, guide, or linkage. This in effect gives the lower edge of the back shell an additional degree of freedom not previously provided in back constructions, since the lower edge of the back shell is free to move and it is the internal structure of the lumbar region and back shell that provides flexural control in the lumbar region. It is considered surprising and unexpected that the lower edge of the back shell can be left unattached . . . such that it merely abuttingly slides on whatever it engages. Notably, the lower edge of the back shell can engage the back frame or can engage another vertical structure such as a wall or upright (i.e., without the lower edge of the back shell being attached to the structure that it abuts). It is contemplated that a bushing or slippery surface or roller can be added to a lower rear edge of the back shell or to the mating front surface of the back frame to facilitate a smooth sliding motion of the back shell during flexure of the lumbar region.

Figure 16:
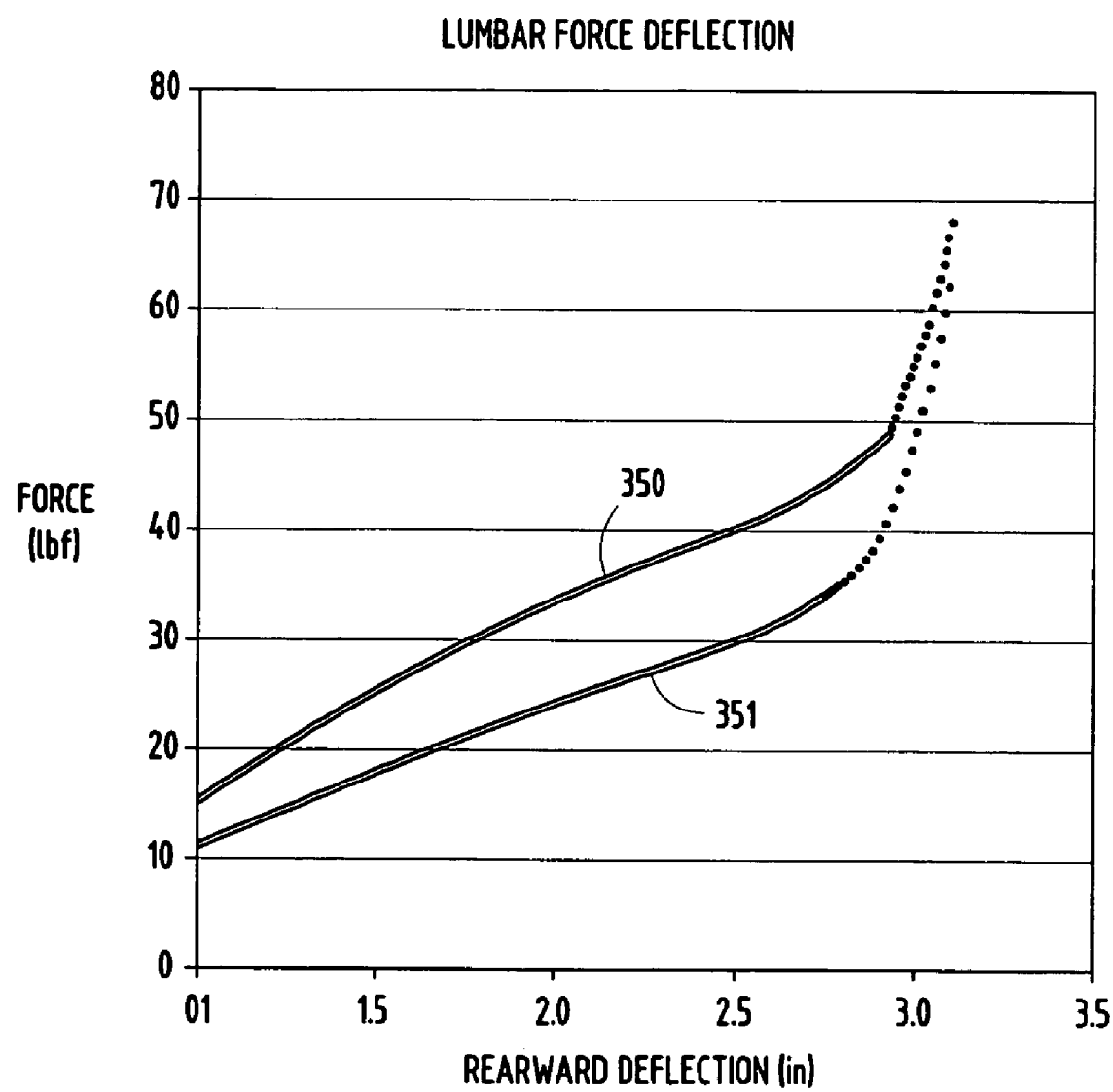
FIG. 16 is a graph showing force versus deflection of a middle and center of a lumbar region of the back shell and leaf spring combinations of FIGS. 2, 8, 10, and 13-15.

FIG. 16 illustrates a graph of force versus deflection for a back construction of the present invention. The upper line 350 represents the force versus deflection during increasing pressure on the lumbar region of a back construction of the present invention. Notably, the resistance to deflection is relatively flat and linear, which is a preferred condition of lumbar support. Also, the lower line 351 represents that force versus deflection during decreasing pressure on the lumbar region. Notably, the resistance to deflection is again relatively flat and linear. Also, there is minimal hysteresis as the force on the lumbar region initially increases and then changes to become a decreasing force. The hysteresis will be affected by drag at the sliding bottom connection, and will also be affected by any set or deformation in the back shell or leaf springs that results by "overflexing" the lumbar region of the back shell. By varying the strength and properties of the leaf springs in the lumbar region, the force deflection curves can be changed substantially. For example, with increased spring strength, the force deflection curves can be made even flatter (i.e., a more constant lumbar supportive force over the entire deflection path) and more linear in shape.

An important reason for the integral leaf springs of the present invention is as follows. A flexible back shell can be designed to move and change shape to mimic the shapes of the human back as the lumbar is flexed. But when made from a flexible thin plastic, it is potentially possible to bend the back shell in additional ways that don't represent human shapes (i.e., "non-human-like" shapes such as "S" shapes).

In the present latest invention, fiberglass leaf springs (or metal leaf springs or springs made of other materials) are integrated into the flexible side bands that connect the relatively rigid upper thoracic and lower pelvis parts of the back shell. These strong leaf springs not only provide the forces necessary for full back support, but also are constructed to provide additional rigidity to the shell so unwanted deflections are minimized or eliminated. For example, when fiberglass springs that are substantially stiffer than the back shell material are integrated into the side bands, it is very difficult to deform them into an "S" shape. Further, it is unlikely for this undesirable shape to happen during normal use, even without the additional constraints of the upper and lower pivots. Because most of the unwanted deformations are eliminated with the addition of the fiberglass leaf springs, a simpler support system for the back shell is practical. The simplified support system can, for example, consist of the same upper pivots in the thoracic area and a simpler guide system in the pelvic area. The simplified guide system controls only the path of the lower back shell and not its rotation (as contrasted to a pivot). The simplified system can be packaged more easily into the support structure and can be located at or behind the comfort surface potentially without loss of comfort to a seated user.

A seating unit 20C (FIG. 13) is not unlike the seating unit 20B (FIG. 9), but includes a modified guiding device at location 27C. The back frame 23C includes a forward leg 76F supporting a seat cushion 31C. Notably, the pivots defined by top connection 24C are located close to but below a top edge of the back shell 22C, and that the back shell 22C extends about equal to a height of the back frame 23C. The illustrated back frame 23C is tubular and defines an inverted rectangular perimeter shape.

The guiding device at bottom location 25C (FIG. 13) includes a plate 10C on each side attached to the back frame 21C. A pin 111C laterally extending from each side of the back shell 22C engages a slot 112C in the plate 110C. The illustrated slot 112C is arcuately shaped and defines a virtual pivot at a location forward of and slightly below a height of the slot 112C. It is contemplated that the slot can be any shape desired to provide the path of movement desired for the bottom edge of the back shell 22C, including any curved shape, linear shape, any vertical, angled forward, or angled rearward orientation, and any combination thereof. The illustrated slot 112C includes a lower portion defining a relatively vertical motion for the lower edge of the back shell as the lumbar region nears an end of its rearward flexure. Leaf springs 309C are attached to the edge strips of the back shell 22C and extend across the lumbar region 26C in a manner controlling flexure of the lumbar region 26C and movement of the pelvic section of the back shell 22C.

In one modified version, one or more studs 81D are extended downwardly from a bottom of the back frame 23C. It is contemplated that the studs 81D can be used to releasably engage a receiver tube. For example, this can be used for stadium seating where it is desirable to remove the seating unit periodically for cleaning or to take it out of bad weather (such as in stadium seating).

The seating unit 20E (FIG. 14) is a wheelchair, and includes a base frame 30E supported on large rear wheels 100E and small steerable front wheels 10E. The back frame 23E is supported on the base frame 30E at bottom location 102E. Location 102E includes vertically oriented tube receivers that telescopingly (removably) receive protrusions 81E. It is contemplated that a laterally-extending spring-biased protrusion or latch can be used to engage a side hole in the tube receivers to securely retain the back 21E thereon. Alternatively, the back 21E can be permanently attached. The illustrated wheelchair unit 20E includes armrests 39E pivoted to laterally extending rods on the back frame 23E. The illustrated armrests 39E are relatively well-padded, but are configured to move out of the way when in an upright storage position, thus complementing the bottom connections 25E in permitting side access into the wheelchair unit 20E when the seat side rails 103E are pivoted out of the way to a down position adjacent the seat, such that they do not extend above the seat. A block 104E attaches to each side (or center of) the back frame 23E, each including a front surface 105E angled forwardly and configured to direct the lower edge of the back shell 22E along a predetermined desired path. A lower edge of the back shell 22E abuttingly slidingly engages the front surface at location 25E to direct the movement of the lower edge during lumbar flexure. The internal leaf springs 309E (see leaf springs 309-309C described above) controls the shape and flexure of the back shell 22E.

A seating unit 20F (FIG. 15) is not unlike the seating unit 20B (FIG. 9), but includes a modified guiding device at location 27F and a cushioned seat 31F. The back frame 23F includes a forward leg 76F pivoted to the seat 31F at location 80F, so that the back 21F can be conveniently folded onto the seat 31F for storage and/or transport. Also, it is noted that the pivots defined by top connection 47F are located below a top edge of the back shell 22F, and that the back shell 22F extends above a top of the back frame 23F, thus providing a slightly different appearance and back flex motion. The illustrated back frame 23F is tubular and defines an inverted rectangular arch shape.

The guiding device at bottom location 25F (FIG. 15) includes a plate 110F on each side attached to the back frame 21F. A pin 111F laterally extending from each side of the back shell 22F engages a slot 112F in the plate 110F. The slot 112F can be any shape desired to provide the path of movement desired for the bottom edge of the back shell 22F, including any curved shape, linear shape, any vertical, angled forward, or angled rearward orientation, and any combination thereof. Springs 309F are attached to the edge strips of the back shell 22F and extend across the lumbar region 26F in a manner controlling flexure of the lumbar region 26F and movement of the pelvic section of the back shell 22F.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A back construction for a seating unit comprising:
   a back shell including a flexible lumbar region, where a vertical section through the lumbar region defines a first radius and where the lumbar region has a first resilient stiffness; and
   at least one vertically-extending elongated spring with a second resilient stiffness at least twice the first resilient stiffness, the elongated spring having an arcuate section coupled to and coextensive with the lumbar region; the lumbar region and the elongated spring forming a combination that, when engaged with a point-focused load, flexes into different shapes while the spring acts to distribute flexure along the lumbar region.

2. The back construction defined in claim 1, wherein the arcuate section of the at least one elongated spring resists bending to a curvilinear non-arcuate shape.

3. The back construction defined in claim 2, wherein the lumbar region of the back shell includes a pair of edge strips and also includes slots extending therebetween.

4. The back construction defined in claim 3, wherein the at least one elongated spring includes first and second elongated springs spaced apart from each other.

5. The back construction defined in claim 4, wherein the first and second elongated springs are leaf springs.

6. The back construction defined in claim 4, wherein the first and second elongated springs include polymeric material.

7. The back construction defined in claim 4, wherein the first and second elongated springs have cross sections that are elongated in a lateral horizontal direction and that are horizontally aligned.

8. The back construction defined in claim 1, wherein a horizontal section in the lumbar region has a forwardly-open concave shape.

9. The back construction defined in claim 1, wherein the spring is made of a material different than the back shell, the material of the spring having memory and resisting taking a set.

10. The back construction defined in claim 1, wherein the spring is attached to the back shell without the use of separate fasteners.

11. The back construction defined in claim 1, wherein the spring includes an end section that frictionally engages and is attached to the back shell, the end section extending above the lumbar region.

12. The back construction defined in claim 1, wherein the lumbar region has a first unstressed curved shape and the spring has a second unstressed curved shape, the combination defining a third curved shape with a radius between radii of the first and second curved shapes.

13. The back construction defined in claim 1, wherein the material of the back shell has a Young's modulus of less than about 170,000 psi, and wherein the material of the spring has a Young's modulus of at least about 5,000,000 psi.

14. The back construction defined in claim 1, wherein the material of the back shell has a yield strength of less than about 3,550 psi, and wherein the material of the spring has a yield strength of at least about 80,000 psi.

15. The back construction defined in claim 1, including a back frame, the back shell being attached to the back frame at a top location and abuttingly engaging the back frame at a bottom location.

16. The back construction defined in claim 15, wherein the bottom location slidably engages a front surface of the back frame during flexure of the lumbar region.

17. The back construction defined in claim 16, wherein the bottom location abuttingly engages the front surface of the back frame and does not provide a direct attachment thereto.

18. The back construction defined in claim 1, including a back frame, the back shell being attached to the back frame at top and bottom locations, the bottom location comprising a track and a follower engaging the track for guiding movement of a bottom edge of the back shell.

19. The back construction defined in claim 18, wherein the track is a slot.

20. The back construction defined in claim 18, wherein the track is non-linear.

21. The back construction defined in claim 18, wherein the track includes a non-vertical component.

22. A back construction for a seating unit comprising:
   a back shell including a flexible lumbar region, where a vertical section through the lumbar region defines a first curve when in an unstressed state; and
   a vertically-extending elongated spring having a curved section coupled to and
   coextensive with the lumbar region; the spring defining a different second curve when in an unstressed state; the lumbar region and the elongated spring forming a third curve different from the first and second curves when coupled together, the lumbar region and spring forming a pretensioned assembled combination that, when engaged with a point-focused load, flexes into different shapes, with the spring being tensioned and acting to distribute flexure along the lumbar region while maintaining a desired supportive force.

23. The back construction defined in claim 22, wherein the elongated spring includes polymeric material.

24. The back construction defined in claim 22, wherein the elongated spring has a cross section that is elongated in a lateral horizontal direction.

25. The back construction defined in claim 22, wherein the spring is made of a material different than the back shell, the material of the spring having memory and resisting taking a set.

26. The back construction defined in claim 22, wherein the material of the back shell has a yield strength of less than about 3,550 psi, and wherein the material of the spring has a yield strength of at least about 80,000 psi.

27. The back construction defined in claim 22, wherein the spring includes an end section that frictionally engages and is attached to the back shell, the end section extending above the lumbar region.

28. The back construction defined in claim 22, wherein the material of the back shell has a Young's modulus of less than about 170,000 psi, and wherein the material of the spring has a Young's modulus of at least about 5,000,000 psi.

29. A back construction for a seating unit comprising:
a back shell including a flexible lumbar region, where a vertical section through the lumbar region defines a first curve when in an unstressed state; and
a vertically-extending elongated spring having a curved section coupled to and
coextensive with the lumbar region; the spring defining a second curve when in an unstressed state; the lumbar region and the elongated spring forming a third curve when coupled together and forming a combination that, when engaged with a point-focused load, flexes into different shapes, with the spring being tensioned and acting to distribute flexure along the lumbar region while maintaining a desired supportive force; wherein the spring is attached to the back shell without the use of separate fasteners.

30. A back construction for a seating unit comprising:
a back shell including a flexible lumbar region, where a vertical section through the lumbar region defines a first curve when in an unstressed state; and
a vertically-extending elongated spring having a curved section coupled to and coextensive with the lumbar region; the spring defining a second curve when in an unstressed state; the lumbar region and the elongated spring forming a third curve when coupled together and forming a combination that, when engaged with a point-focused load, flexes into different shapes, with the spring being tensioned and acting to distribute flexure along the lumbar region while maintaining a desired supportive force; and a back frame, the back shell being attached to the back frame at a top location and abuttingly engaging the back frame at a bottom location.

31. The back construction defined in claim 30, wherein the bottom location slidably abuttingly engages a front surface of the back frame during flexure of the lumbar region.

32. A back construction for a seating unit comprising:
a one-piece back shell including a flexible lumbar region defining a first shape; and
a vertically-extending elongated spring defining a different second shape attached to the back shell and extending vertically across the lumbar region, the elongated spring being when attached to the back shell being pretensioned and defining a third non-linear shape different than the first and second shapes, with the spring being coextensive with the lumbar region and forming a combination with the lumbar region that, when engaged with a point-focused load, flexes into different shapes, with the spring acting to distribute flexure along the lumbar region.

33. The back construction defined in claim 32, wherein the elongated spring is attached to the shell by at least one releasable mechanical connection that includes at least one loop for receiving the spring.

34. The back construction defined in claim 32, wherein the spring includes an end section that frictionally engages and is attached to the back shell, the end section extending above the lumbar region.

35. The back construction defined in claim 32, wherein the spring is made of a material different than the back shell, the material of the spring having memory and resisting taking a set.

36. A back construction for a seating unit comprising:
a back shell including a flexible lumbar region defining a first shape; and
a vertically-extending elongated spring defining a different second shape attached to the back shell and extending vertically across the lumbar region, the elongated spring when attached to the back shell being pretensioned and defining a third non-linear shape different than the first and second shapes, the spring being attached by a releasable mechanical connection, the spring being coextensive with the lumbar region and forming a combination with the lumbar region that, when engaged with a point-focused load, flexes into different shapes, with the spring acting to distribute flexure along the lumbar region, wherein the spring is attached to the back shell without the use of separate fasteners.

37. The back construction defined in claim 36, wherein the releasable mechanical connection includes at least one loop for receiving the spring.

38. The back construction defined in claim 36, wherein the spring is made of a material different than the back shell, the material of the spring having memory and resisting taking a set.

39. The back construction defined in claim 36, wherein the lumbar region of the back shell includes a pair of edge strips and also includes slots extending therebetween.

40. A back construction for a seating unit comprising:
a back shell including a flexible lumbar region; and
a vertically-extending elongated spring attached to the back shell and extending vertically across the lumbar region, the elongated spring being attached to the back shell by a releasable mechanical connection, the spring being coextensive with the lumbar region and forming a combination with the lumbar region that, when engaged with a point-focused load, flexes into different shapes, with the spring acting to distribute flexure along the lumbar region, including a back frame, the back shell being attached to the back frame at a top location and slidably engaging the back frame at a bottom location.

41. The back construction defined in claim 40, wherein the bottom location slidably abuttingly engages a front surface of the back frame during flexure of the lumbar region.

42. The back construction defined in claim 40, wherein the spring is made of a material different than the back shell, the material of the spring having memory and resisting taking a set.

43. The back construction defined in claim 40, wherein the spring and back shell define a laminar arrangement.

44. A back construction for a seating unit comprising:
a back shell including a flexible lumbar region; and
a vertically-extending elongated spring attached to the back shell and extending vertically across the lumbar region, the elongated spring being attached to the back shell by a releasable mechanical connection, the spring being coextensive with the lumbar region and forming a combination with the lumbar region that, when engaged with a point-focused load, flexes into different shapes, with the spring acting to distribute flexure along the lumbar region, wherein the material of the back shell has a Young's modulus of less than about 170,000 psi, and wherein the material of the spring has a Young's modulus of at least about 5,000,000 psi.

45. The back construction defined in claim 44, wherein the lumbar region of the back shell includes a pair of edge strips and also includes slots extending therebetween.

46. The back construction defined in claim 44, wherein the at least one spring and back shell define a laminar arrangement.

47. A back construction for a seating unit comprising:
a back shell including a flexible lumbar region; and
a vertically-extending elongated spring attached to the back shell and extending vertically across the lumbar region, the elongated spring being attached to the back shell by a releasable mechanical connection, the spring being coextensive with the lumbar region and forming a combination with the lumbar region that, when engaged with a point-focused load, flexes into different shapes, with the spring acting to distribute flexure along the lumbar region, wherein the material of the back shell has a yield strength of less than about 3,550 psi, and wherein the material of the spring has a yield strength of at least about 80,000 psi.

48. The back construction defined in claim 47, wherein the lumbar region of the back shell includes a pair of edge strips and also includes slots extending therebetween.

49. The back construction defined in claim 47, wherein the spring and back shell define a laminar arrangement.

50. A back construction for a seating unit comprising:
a one-piece back shell including a flexible lumbar region; and
a vertically-extending elongated spring attached to the back shell and extending vertically across the lumbar region, the elongated spring being attached to the back shell and being coextensive with the lumbar region and forming a combination with the lumbar region that, when engaged with a point-focused load, flexes into different shapes, with the spring acting to distribute flexure along the lumbar region; wherein the lumbar region of the back shell includes a pair of edge strips and also includes slots extending therebetween.

51. The back construction defined in claim 50, wherein the spring and back shell define a laminar arrangement.

52. A back construction for a seating unit comprising:
a back shell including a flexible lumbar region; and
a vertically-extending elongated spring attached to the back shell and extending vertically across the lumbar region, the elongated spring being attached to the back shell by a releasable mechanical connection, the spring being coextensive with the lumbar region and forming a combination with the lumbar region that, when engaged with a point-focused load, flexes into different shapes, with the spring acting to distribute flexure along the lumbar region, wherein the releasable mechanical connection characteristically does not include separate fasteners.

53. The back construction defined in claim 52, wherein the lumbar region of the back shell includes a pair of edge strips and also includes slots extending therebetween.

54. The back construction defined in claim 52, wherein the releasable mechanical connection includes at least one loop for receiving the spring.

55. The back construction defined in claim 52, wherein the spring is made of a material different than the back shell, the material of the spring having memory and resisting taking a set.

56. A back construction for a seating unit comprising:
a back frame;
a back shell including a flexible lumbar region with edge strips extending vertically across the lumbar region and including leaf springs attached to the back shell and supporting the edge strips to form a combination with the lumbar region that, when engaged with a point-focused load, flexes into different shapes, with the springs acting to distribute flexure along the lumbar region;
a top connection connecting the back shell to the back frame; and
bottom means located entirely rearward of a front surface of the back shell for supporting a lower edge of the back shell on the back frame for relative movement to the back frame when the lumbar region is flexed, with the leaf springs controlling a majority of the flexure of the lumbar region.

57. The back construction defined in claim 56, wherein the bottom means includes first and second surfaces on the back frame and back shell that slidingly abuttingly engage, but that do not provide a direct physical attachment.

58. The back construction defined in claim 56, wherein the bottom means includes at least one track and mating follower.

59. The back construction defined in claim 58, wherein the track includes a non-vertical component.

60. The back construction defined in claim 58, wherein the track is non-linear.

61. The back construction defined in claim 56, wherein the bottom means includes a slot and sliding pin on each side of the back shell.

* * * * *

UNITED STATES PATENT AND TRADEMARK OFFICE
CERTIFICATE OF CORRECTION

PATENT NO. : 7,237,841 B2 Page 1 of 1
APPLICATION NO. : 11/048673
DATED : July 3, 2007
INVENTOR(S) : Christopher J. Norman et al.

It is certified that error appears in the above-identified patent and that said Letters Patent is hereby corrected as shown below:

Column 10, line 29;
   "10C" should be --110C--.
Column 10, line 55;
   "10E" should be --101E--.
Column 14, claim 32, line 7;
   Delete "being". first occurrence
Column 15, claim 46, line 29;
   Delete "at least one".

Signed and Sealed this

Twenty-fifth Day of December, 2007

JON W. DUDAS
*Director of the United States Patent and Trademark Office*